United States Patent [19]
Russo et al.

[11] Patent Number: 5,701,383
[45] Date of Patent: Dec. 23, 1997

[54] VIDEO TIME-SHIFTING APPARATUS

[75] Inventors: James Russo, Ann Arbor, Mich.;
Michael R. Levine, Boca Raton, Fla.

[73] Assignee: Gemstar Development Corporation, Pasadena, Calif.

[21] Appl. No.: 388,345

[22] Filed: Feb. 14, 1995

Related U.S. Application Data

[63] Continuation-in-part of Ser. No. 247,129, May 20, 1994, abandoned.

[51] Int. Cl.$^6$ ............................................. H04N 5/76
[52] U.S. Cl. .............................. 386/46; 386/64; 386/70; 386/72; 386/125; 360/7; 360/75; 360/63; 369/60
[58] Field of Search ........................ 360/7, 10.1, 32, 360/75, 33.1, 22, 63, 9.1, 14.2, 14.3, 72.1, 72.2, 70; 348/563, 564, 571; 358/335, 342; 369/32, 60, 111, 96, 7; 386/46, 52, 55, 57, 60, 64, 65, 68, 69, 70, 72, 109, 125, 126

[56] References Cited

U.S. PATENT DOCUMENTS

| | | | |
|---|---|---|---|
| 3,341,833 | 9/1967 | Jones | 340/174 |
| 3,645,539 | 2/1972 | Jenkins | 274/242 |
| 3,682,363 | 8/1972 | Hull | 226/118 |
| 3,855,426 | 12/1974 | Bouwhuis | 358/342 |
| 4,283,735 | 8/1981 | Jagger | 358/4 |
| 4,319,286 | 3/1982 | Hanpachern | 360/33 |
| 4,325,080 | 4/1982 | Satoh | 360/14.3 |
| 4,408,309 | 10/1983 | Kiesling | 369/7 |
| 4,430,676 | 2/1984 | Johnson | 360/13 |
| 4,445,195 | 4/1984 | Yamamoto | 364/900 |
| 4,577,240 | 3/1986 | Hedberg | 360/22 |
| 4,633,331 | 12/1986 | McGrady | 360/7 |
| 4,786,982 | 11/1988 | Wakahara | 360/33.1 |
| 4,876,670 | 10/1989 | Nakabayashi | 365/194 |
| 4,891,715 | 1/1990 | Levy | 360/14 |
| 4,908,713 | 3/1990 | Levine | 358/335 |
| 4,949,187 | 8/1990 | Cohen | 360/33.1 |
| 4,963,866 | 10/1990 | Duncan | 341/110 |
| 4,972,396 | 11/1990 | Rafner | 369/32 |
| 4,991,033 | 2/1991 | Takeshita | 360/32 |
| 5,021,893 | 6/1991 | Scheffler | 360/15 |
| 5,063,453 | 11/1991 | Yoshimura | 360/32 |
| 5,134,499 | 7/1992 | Sata | 369/54 |
| 5,227,934 | 7/1993 | Vasilescu | 360/90 |
| 5,241,428 | 8/1993 | Goldwasser | 360/7 |
| 5,329,320 | 7/1994 | Vifrach | 348/738 |
| 5,345,430 | 9/1994 | Moe | 369/7 |
| 5,357,383 | 10/1994 | Godwin | 360/74 |
| 5,371,551 | 12/1994 | Logan | 369/60 X |
| 5,438,423 | 8/1995 | Lynch | 360/33.1 |
| 5,457,583 | 10/1995 | Kaneko | 360/63 |
| 5,555,463 | 9/1996 | Staron | 348/560 |

Primary Examiner—Aristotelis M. Psitos
Assistant Examiner—Alan Faber
Attorney, Agent, or Firm—Gifford, Krass, Groh, Sprinkle, Patmore, Anderson & Citkowski

[57] ABSTRACT

A video time-shifting system characterized in having a continuous recording track accessed by separate, asychronous read and write facilities enables playback of a video program to commence from any point in the program while continuing to be recorded in real time, thus providing VCR-like program control features such as PAUSE/RESUME, REWIND, and FAST FORWARD. A memory is used to store information relating to various points in the program so that even upon receipt of multiple PAUSE commands, the system automatically keeps track of correct program re-entry. In the preferred embodiment, the storage means takes the form of a continuous recording track in a magnetic disk drive. To prevent discontinuities associated with the recording and reproducing of material representative of the video program, the system preferably incorporates a plurality of write heads, each associated with a different recording track, and the system automatically switches from one write head to another so as to effectively link the different recording tracks into a single, continuous recording track. Although program information may be stored in analog form, digital storage is used in the preferred embodiment along with data compression to increase recording capacity. The system preferably further includes a video display generator to output for viewing on the display device visual indicia relating to the program and, additionally, symbols relating to one or more points in the program and/or the time-shifted version thereof.

19 Claims, 2 Drawing Sheets

VIDEO TIME-SHIFTING APPARATUS

REFERENCE TO PRIOR APPLICATIONS

This is a continuation-in-part of U.S. Ser. No. 08/247,129, filed May 20, 1994 now abandoned.

FIELD OF THE INVENTION

The present invention relates generally to the storage and retrieval of video programming and, more particularly, to a system operative to produce a time-shifted version of an incoming video program to give an operator the type of control over the program ordinarily associated with local storage.

BACKGROUND OF THE INVENTION

One reason for the immense popularity of the video rental industry is that cassette-stored programming gives the viewer total control over playback operations. Not only can the purchaser choose to watch a movie when desired, but also functions such as PAUSE, FAST FORWARD and REWIND may be used to take a break from viewing, review material of interest, or advance beyond portions which previously have been viewed or which may be of no interest to the viewer.

Programs broadcast in real time do not offer such viewer conveniences. With the advent of cable distribution and the ongoing increase in channel capacity, a greater number of video programs will become available, including numerous feature-length movies. Accordingly, some industry observers have proposed two-way cable systems wherein the same movie may be broadcast over different channels at slightly staggered starting times, so that viewers may be able to switch between these channels, thereby simulating VCR-like operator controls such as PAUSE, FAST FORWARD and REWIND. However, these schemes do a poor job of simulating operator control, due to the relatively large temporal transitions involved; furthermore, they are extremely wasteful of bandwidth, which could otherwise be used for entirely different programs, thereby satisfying a larger audience.

Sara et al. (U.S. Pat. No. 5,134,499) disclose an apparatus for recording video to provide the equivalent of a variable-length "tape-delay," preferably by way of magneto-optical disc storage. However, recording capacity is limited, and when the record optical head assembly reaches the end of the track at the outer edge of the disc, it must be repositioned rapidly to the beginning of the track, which requires the use of buffer means to ensure that no signal content is lost during the mechanical repositioning process. Furthermore, Sara et al. provide only minimal provisions for control of the operation of the read optical head assembly, including only those provisions necessary to position the read optical head assembly at a particular point at which to begin playback of the program material.

Goldwasser et al, U.S. Pat. No. 5,241,428 discloses a variable-delayed video recorder, including a user control panel which enables playback of previously recorded material to be temporarily stopped and then resumed without interrupting the recording of new material. If there are portions of the program that the user does not wish to see (e.g., commercials), he can speed (i.e., FAST FORWARD) through those recorded portions and catch up to the live broadcast. The user can also rewind and replay portions of the program as the video recorder continues to record the program. However, in all embodiments of the invention the video program material is effectively stored in a FIFO (first-in, first-out) buffer of variable length so that the user can view the video material in the sequence in which it is broadcast, while varying the delay between recording and playback. Additionally, the "random access" embodiment of the invention is based upon retrieving stored samples from a memory, thus requiring an algorithm to control the storage and retrieval of such samples, a complication that could be avoided through a continuous and uninterrupted recording.

Therefore there remains an unsatisfied need for a video time-shifting apparatus capable of recording a full-length program without discontinuity and without the need for extensive, auxiliary buffering. Such a system should not only support asynchronous recall of the program, but should provide a user with sophisticated, VCR-like controls over the program, such as PAUSE/RESUME, REVIEW, REWIND, and FAST FORWARD. Additionally, as the user may be interested in accessing particular points in either the incoming or any time-shifted version of the program, facilities to communicate playback progress and to mark points of interest would also prove convenient.

SUMMARY OF THE INVENTION

The present invention is directed toward a video time-shifting system including storage means, disposed in a video path between a video input and output, and configured as a continuous recording track accessed by separate, asynchronous read and write facilities. Broadly, under operator control, reading may occur at any point on the continuous recording track, and playback of the program may begin therefrom, thus simulating VCR-like program control features such as PAUSE/RESUME, REVIEW, REWIND, and FAST FORWARD. The system may be disposed in a separate housing or form part of a video cassette recorder, television receiver, monitor, personal computer, or any other piece of equipment associated with the viewing of video-based programming.

In the preferred embodiment, the video storage means takes the form of a magnetic disk drive having multiple, asynchronous read and write heads, and a controller which links separate recording tracks which may be present on separate recording surfaces, into a single, continuous recording track. More specifically, a dual-sided disk is used with a pair of write heads directly above and below one another, and the positioning system which moves them as an integral unit inwardly and outwardly along a radial path. A pair of read heads are further provided and mechanically linked above and below one another to access the upper and lower surfaces of the disk for playback purposes, using separately controlled actuators so that the write and read heads do not interfere mechanically. With such a configuration, the disk may spin at constant speed, with the write heads moving slowly as a unit between the inner and outer edges associated with their respective disk surfaces, with one of the write heads recording information representative of the incoming video program as a continuous spiral track. When the writing head reaches an innermost or outermost extent of its associated track, recording is immediately switched to the other write head, and movement of the heads is reversed, thereby linking the tracks present on the upper and lower surfaces into a single, continuous track, without the need for extensive buffering of the program as received. Switching of the read heads, being similarly joined into a physical unit, may also immediately switch at such turnaround points, to ensure that readout may likewise occur on a smooth, continuous basis. Although, in the preferred embodiment, a pair of read and write heads are used in conjunction with a two-sided recording surface, different write and read heads may be used in conjunction with different recording surfaces, so long as the system controller is able to perform the necessary switching to link separate recording tracks into a single track so as to avoid discontinuities in the reading and writing program.

A memory is used to store information relating to various points in the program so that, for example, when a PAUSE command is received, the memory stores information relating to that point in the program, and when a RESUME command is received, playback automatically commences from that point, thereby outputting the program time shifted by the delay between the receipt of the two commands. When paused, the system preferably outputs a FREEZE FRAME, and even upon receipt of multiple PAUSE commands, the system automatically keeps track of correct program re-entry.

In the case of a REVIEW command, previously recorded points of the program are rapidly accessed and displayed. That is, the program moves backwards while the REVIEW command is activated, for example, using an associated button on a remote control, until such time that the button is no longer depressed, at which time normal display of the program commences, but from a point in the program previous to real time. The system is also capable of REWIND in the sense that any previously recorded point of the program may be immediately accessed, with playback commencing therefrom, similar to a REWIND function with a VCR in the STOP mode, except that, owing to the advantageous implementation of the invention, such an operation is carried out in a near instantaneous manner.

If a time-shifted version of the program is being output for any reason, a FAST FORWARD command may be entered, in which case playback is speeded up until deactivation of the command, at which time normal playback resumes, resulting in the output of the program exhibiting a reduced time shift, including a zero time shift in the event the operator "catches up" with the incoming program as it is being received.

Optional operator controls enable the viewer to jump ahead in the program, for example, to advance in increments of 30 seconds so as to avoid the viewing of commercial advertisements.

The system preferably further includes a video display generator to output for viewing on the display device visual indicia relating to the program and, additionally, symbols relating to one or more points in the program and/or the time-shifted version thereof. The system is optionally further operative to accept a MARK command associated with a user-defined point in the program, and commence playback directly therefrom.

DETAILED DESCRIPTION OF THE INVENTION

Figure 1:
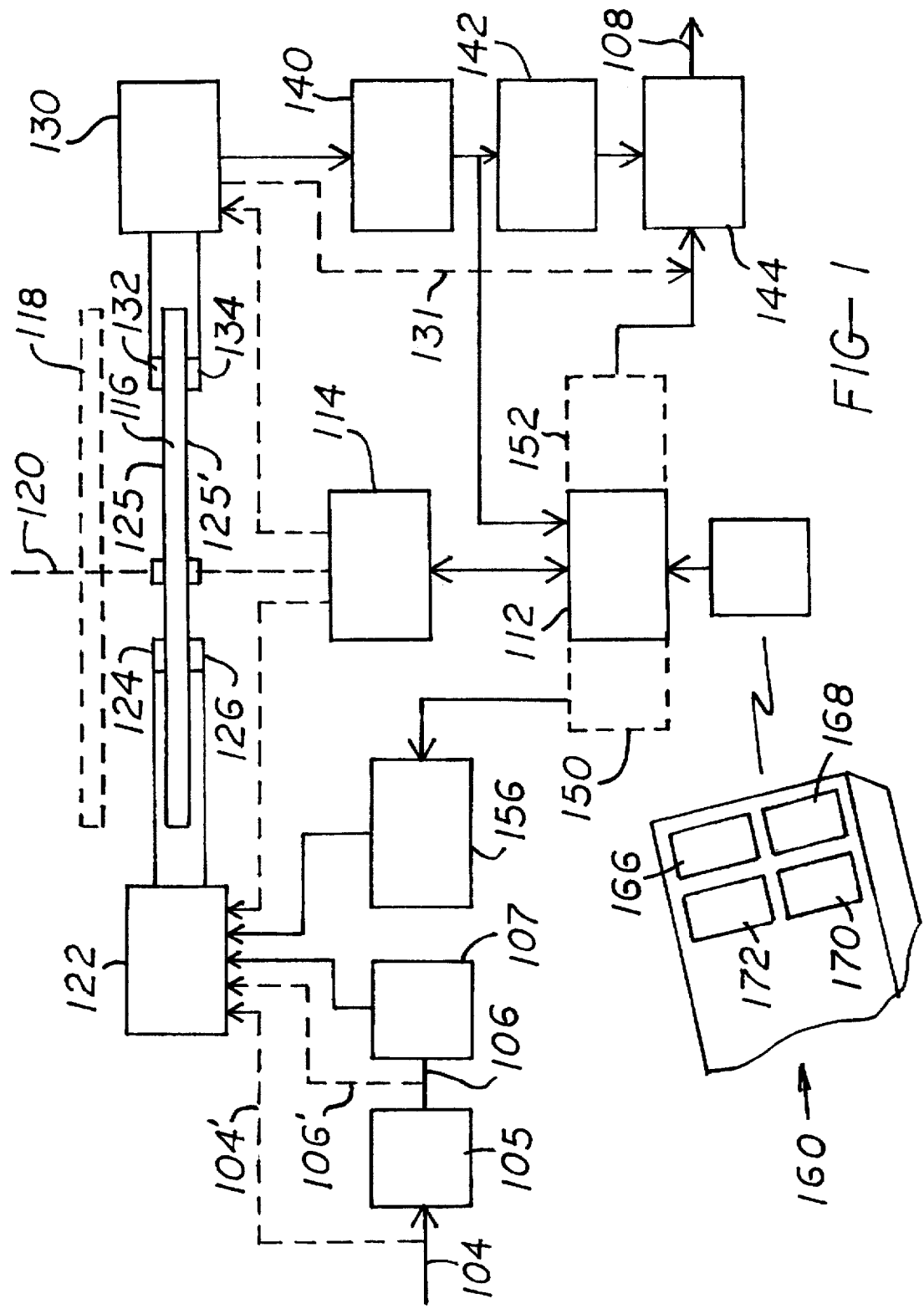
FIG. 1 is a block diagram of a system which provides operator control over an incoming video program utilizing a disk drive to store video-based information in digitally compressed form.

The present invention provides operator control over an incoming video program, even if such program is broadcast in real time. Broadly, the invention causes a video transmission in progress to be displayed so as to give an operator the impression that the video program material is locally stored, thereby enabling functions such as PAUSE and RESUME to be carried out upon the program material that has already been received.

Subject to implementation variations described below, the system automatically and continuously records the incoming program selected by a user on an associated display device. If a program-control command is received, the system continues to store the incoming video program and keeps track of the exact position in the program associated with the activation of the particular command. Thus, when a PAUSE is followed by a RESUME command, the program continues to be displayed from the point at which it was paused, although now time shifted relative to the broadcast as received. The system also preferably outputs a "FREEZE FRAME" of the program to the display device during activation of the PAUSE. The system accommodates multiple PAUSE commands, always keeping track of the correct program re-entry point to ensure that the entire program is ultimately delivered to an associated display device.

A similar time-shifting occurs upon activation of a REVIEW command, which causes the program to run backwards on the associated display device, until deactivation of the command, at which time playback commences, again resulting in the display of a time-shifted version. If a time-shifted version is currently displayed for any reason, be it through PAUSE/RESUME or REVIEW/REWIND, the system preferably further supports the ability to FAST FORWARD the program, at least to the extent of the time shift, until such time that the operator has "caught up" with the incoming program as it is being received. Such time shifting is not limited to the duration of the original program broadcast or the immediate time period following, however, and, in fact, the viewing of the program could be completed several days later, allowing the invention to function like a conventional video recorder.

Although the foregoing discussion has referred to time-shifted "versions" of the program, the reader should realize that, in fact, there is only one recorded version of the program, that being written onto the recording medium, be it a tape, disk, and so forth. These time-shifted versions of the program simply refer to the way in which reading of the program is carried out for playback purposes.

Operator control is enhanced by allowing the viewer to jump forward or backward through the program by programmable steps, for example at 30-second intervals, thereby allowing the viewer a more convenient method to skip undesirable program material, such as commercial advertisements. In order to quickly determine those functions which a user has carried out, and to access points of the program in a straightforward manner, the invention preferably includes a means to display visual indicia on the associated display device indicative of the time shift, and points of interest in the program, whether inherent or user-defined.

FIG. 1 shows, in block diagram form, a high-level overview of a system based upon the principles of the invention. A source of video program material is received over path 104, and video to be played or replayed is delivered along line 108 to a display device (not shown). The source of video program material may take any form, including off-air or satellite reception, cable transmission, etc., whether in analog, digital or digitally compressed form. The system may also be used when downloading video information from a computer network. The display may include any type of video monitor, including VGA-format computer video, standard television, or HDTV formats.

A system controller 112 receives instructions from an operator input, shown generally at 160, and coordinates record and playback functions of a video storage means as necessary to effectuate a particular command, as described herein below.

Certain of the components depicted in FIG. 1, and in particular the system controller 112 and storage means, may be contained within any type of enclosure associated with video processing, including a video cassette recorder (VCR), a separate enclosure, or such components as alternatively may be included with a television receiver, monitor or personal computer, since the invention resides in large part in the manner in which the controller 112 has been programmed to ensure the complete replay of an input video program, even when delayed some period of time from when broadcast or received in real time.

In a VCR application, although the invention may be configured in-line prior to the cassette recorder portion, thereby enabling the output video signal to be routed either to a display device, or to the cassette, or both, the cassette recorder portion may instead be configured in-line prior to the apparatus of the invention. As such, the "incoming video" as defined herein may include not only live broadcasts, but also program material derived from the cassette during play. Such an arrangement offers particular advantages, including the ability of certain controls such as REVIEW, REWIND and FAST FORWARD (assuming a time-shift) to respond immediately, thus avoiding any time delays associated with tape transport. That is, given a configuration wherein the cassette plays continuously from beginning to end, in the event that such a command is received, instead of actually moving the tape, the invention may instead be used for a more efficient implementation of this function, including the ability to review large amounts of program material on an express basis, including jumps associated with long program sequences, which would be impractical through actual tape transport, and which might result in unnecessary stress on the tape.

The discussion with respect to FIG. 1 centers on video storage means in the form of a magnetic disk drive, though such storage means may take other forms, including magnetic tape, optical disk, magneto-optical disk, or solid state memory, for example a very high capacity charge-coupled device, video RAM, and so forth. In a disk-based configuration, system controller 112 interfaces with a disk controller 114, which is responsible for accurate rotation of the disk 116 and any additional platters 118 rotatable about axis 120, and also coordinates recording of information representative of a video program through write circuitry 122, through proper positioning of write heads 124 and 126. Additionally, disk controller 114 provides asynchronous control over replay through read circuitry 130 in concert with positioning of read heads 132 and 134.

The disk drive is of a read/write type similar to those used in personal computers, but preferably with independent read/write heads, one set being employed for recording, and the other being used for playback, using separately controlled actuators so that the heads do not interfere mechanically. Although a typical personal-computer disk drive currently is capable of reading or writing data at approximately eight times the data rate required for compressed digital video, it necessarily would be required to alternate between writing, repositioning, reading, and repositioning again, which could produce undesirable noise and heat, thereby shortening the lifetime of the drive and perhaps generating unwanted visual artifacts in need of correction. This would also require buffering of at least several frames of video during record and playback operations. As such, the preferred multiple-head solution eliminates rapid head movement, and also eliminates the requirement for buffering. A separate frame store may, however, be necessary in conjunction with the compression and decompression engines 107 and 140, respectively, discussed below.

In the preferred multiple-head version of the invention, while the disk drive spins at constant speed, the record heads move slowly between the outer edge and the inner edge of the recording surface. When a head reaches its turnaround point, the recording function is automatically switched to the next head in the set. As such, data on one surface is recorded from the outer edge to the inner edge, while data on the surface associated with the other head is recorded from the inner edge to the outer edge, thus obviating the need for random head repositioning.

In the preferred embodiment, write heads 124 and 126 are located directly above and below one another, respectively, and are physically joined so that the head positioning apparatus moves both heads radially inwardly and outwardly as a unit. Using such a structure, then, assuming head 124 is currently writing data representative of an incoming video program along a continuous spiral track with respect to the upper surface of the disk 116, when the heads are extended radially inwardly to their greatest possible extent, for example, with head 124 being positioned at the end of track 125, the system automatically switches writing from head 124 to 126, which represents the end-of-track position 125' on the lower surface of the disk 116, at which time the write heads are jointly moved radially outwardly and data representative of an incoming video program is written on a spiral track defined on the bottom surface of the disk 116. When write heads 124 and 126 have been moved outwardly to their greatest possible extent, that is, toward the outer periphery of the disk 116, the writing process is again switched, now from head 126 back to head 124. Disk controller 114 coordinates activities of the read and write circuits and head positioning mechanisms in conjunction with the system controller 112 to ensure a smooth transition between the switching of the writing heads, without the need of any extensive buffering.

Although the physical end-of-track positions are used as the switching points for the write heads, this switching need not be associated with any physical limit, but instead may occur with respect to any position on one or more disks, whether single- or double-sided, so long as the switching is used to link individual recording surfaces into a single, continuous track. Thus, an internal portion of a disk surface may be used in conjunction with a different, internal portion of another disk surface, switching between the two surfaces to bring about a continuous writing process without ever reaching a physical end-of-track position. Furthermore, although FIG. 1 shows the two write heads 124 and 126 on opposite sides of the same disk, though this may represent a preferred configuration, switching among write heads may alternatively be carried out with respect to different write heads associated with other platters.

In all embodiments, reading of the video-based information is necessarily carried out asynchronously from the writing thereof, to provide the operator control features referenced above. In the preferred embodiment, the read heads 132 and 134 are similarly directly above and below one another with respect to the same disk 116, the positioning of which is independently controlled through read circuitry 130. The read heads 132 and 134 also move as a unit to ensure that if reading must move past a point where switching between write heads has previously occurred, whether at the end-of-track boundary or otherwise, simultaneous switching of the read head may likewise occur at this point to ensure that recall of the video-based information may be read out without discontinuity, and without the need for any extensive buffering with respect to the read operations.

Operator commands preferably at least include a PAUSE/ RESUME function, activated through buttons 166 and 168, respectively, on operator control 160. Depending upon overall system capability, a FAST FORWARD function 170, REVIEW or REWIND function 172, and other operator controls, may additionally be provided. In the preferred embodiment, the controller 160 represents a remote unit, such as a conventional infrared-type (IR) remote controller unit, which previously may have been made available, as part of a television or VCR system, or may instead be provided as an integral part of the invention.

System controller 112 preferably takes the form of a microprocessor or microcomputer of conventional design, and integrates other aspects 152 including a real-time clock 150, read-only memory 152 containing both the software necessary to carry out the functions described and also an optional set of prompting messages, graphical symbols, and so forth, and any read/write memory necessary for storing temporary information. Controller 112 connects to any or all of the other subsystems, as necessary, to implement the particular configuration selected.

If received in analog form, the incoming video is first digitized by an optional analog-to-digital (A-D) converter 105. The output of the A-D converter 105 is then preferably delivered to a compression engine 107 so as to reduce the size of the digital representation. Dashed lines 104' and 106' are used to indicate that other types of video signals may be used directly for recording purposes, including direct analog recording, digital recording without compression and digital recording of a previously compressed signal. The invention may therefore take direct advantage of systems wherein the video signal is in digitally compressed form, including recently introduced digital satellite systems, and in compliance with digitally implemented HDTV broadcast standards.

Regardless of the point at which this compression is carried out, decompression engine 140 is used to expand the program back into a non-compressed form. Although blocks 107 and 140 are shown separate from one another in FIG. 1, these functions, may in fact, be combined into a single physical entity, such as a programmed microcomputer which performs a particular compression algorithm in both directions. This algorithm may conform to the Joint Photographic Experts Group (JPEG, ISO, Standard H.261) Motion Pictures Experts Group (MPEG), the newly introduced MPEG-II, or any appropriate standard or proprietary method of reducing data requirements.

This compression engine alternatively may be configured under system control so as to provide user options in selecting a particular compression algorithm or compression ratio, for example, to enable a viewer to select a lower-quality image to increase the available program recording time for a given amount of storage capacity. This type of compromise, that is, quality vs. recording time, is currently performed by users when selecting SP-mode vs. EP-mode recording options in conjunction with video cassette recorders. In combination with this invention, these compromises could involve aspects such as compression ratio, spatial or temporal processing, frame-rate reduction, and so forth.

Optional digital-to-analog (D-A) converter 142 converts the decompressed digital representation of the video program back into an analog signal, if necessary, for subsequent display. Display generation circuitry 144 is used to display operator prompting messages provided by controller 112, as well as to indicate points in the program, including a time-shifted version, as well as the relative delay between the record time and the playback time. Dashed line 131 is used to indicate that in the event the program material was previously recorded in analog form, decompression blocks 140 and 142 may be obviated, and a signal from the read circuit 130 may be output directly along path 108, preferably through display generator 144.

Marker memory 156, which may be separate from, or integrated with, system controller 112, is used to load information concerning program markers described below, and to keep track of any other points of interest in the program which may have been automatically generated by the system. In the preferred embodiment, using a magnetic disk for storage, recording surfaces of such a disk are typically arranged in terms of radially outward spokes defining sectors and concentric rings defining tracks. As such, a marker memory 156 preferably stores sector and track information associated with a point of interest, whether user entered or automatically generated by the system, to enable the head positioning apparatus to move on an express basis to those track and sector locations associated with a particular point of interest. Any other approach capable of locating program storage locations may alternatively be used.

Figure 2A:
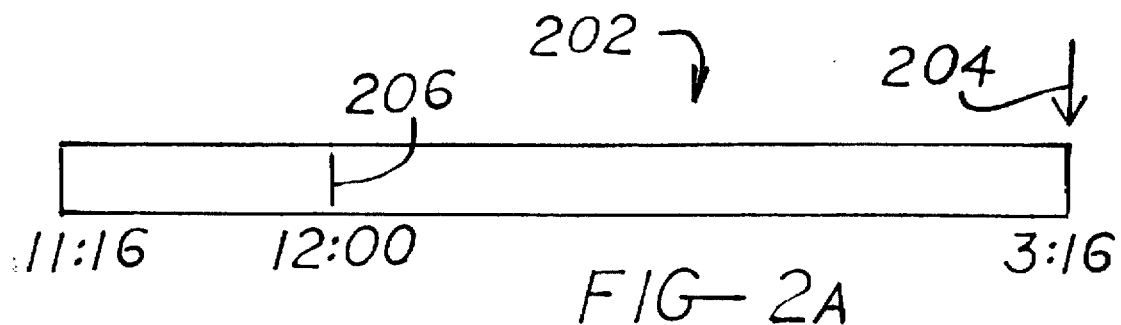
FIG. 2A is a drawing of a display generated by the invention which may be used to provide feedback concerning the recording progress and the placement of markers at user-defined points in the program.

FIG. 2 illustrates ways in which status information may be conveyed to a viewer through the use of program-related graphical indicia displayed on the same screen as the program material itself. Although the following discussion concentrates of the use of a horizontal bar-type of graphical representation, it should be understood that other means to communicate the same information may alternatively be used, including clock faces and other graphical symbology, in addition to text or numerical-only formats;

FIG. 2A illustrates one possible display associated with an incoming program for which detailed schedule information, including exact starting or ending times is unavailable. Such might be the case if the program is derived from a video cassette or received in broadcast form through a system which does not provide such supplemental information. It is assume that the display of FIG. 2A and the other displays discussed below are not necessarily always visible on the screen, but may appear on a selectively basis, for example, when a user depresses a button on a remote control.

In FIG. 2A, the horizontal width of the bar 202 is representative of the period of time over which the incoming program has been recorded, and thus also reflects the amount of program material actually recorded by the system. It is assumed that recording commenced at 11:16 a.m., and that the present time 3:16 p.m. not only are both values optionally but conveniently displayed, but also an arrow or cursor 204 is conveniently used to indicate that point of the program now being output to the screen. In the event that the picture is being watched in real time, this arrow 204 will coincide with the rightmost edge of the horizontal bar 202, and both will slowly move rightwardly as the recording apparatus continues to store additional amounts of the incoming programming. FIG. 2A also shows how one or more markers 206 may conveniently but optionally be inserted by the user, for example, to mark particular times or portions in a program to which the viewer might wish to return. The marker 206, in FIG. 2A, for example, has been placed at 12 noon. Such markers may be inserted in at least two ways. Firstly, as the program is being watched, the viewer sees something of interest to which the viewer may wish to return, such a mark may be entered immediately at that time, preferably through a MARK function provided on the remote control. Alternatively, if the viewer later remembers something worthy of marking, the arrow 204 may be dragged back to any previously recorded of the program, until that sequence is found, then marked, then, if the viewer so desires, the arrow 204 may be returned to any other previously recorded portion of the program, including real time, with viewing resuming therefrom.

Figure 2B:
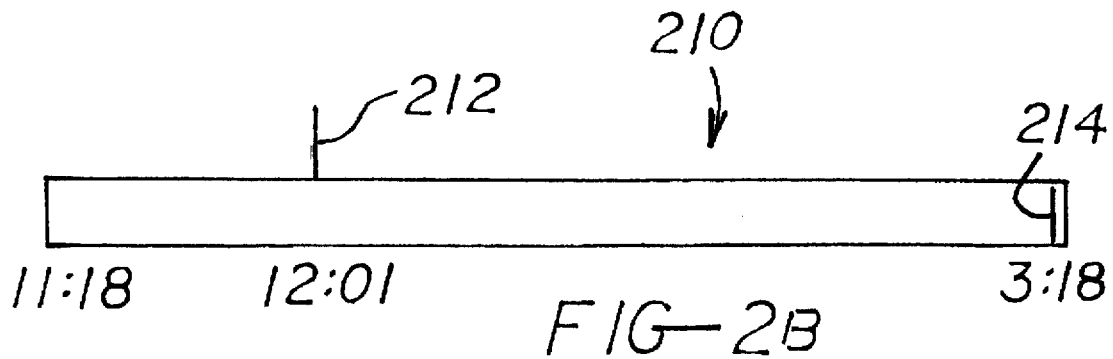
FIG. 2B is a version of the display of FIG. 2A wherein the viewer has moved a cursor in alignment with a previously set marker to view a time-shifted version of a program as it is being recorded.

In FIG. 2B, a viewer has moved the cursor 212 back to the marker at 12 noon, with program being output from that time. Since the viewer is no longer watching the program in real time, a marker 214 may be placed at the point associated with the viewer's departure from the real time broadcast. In this and other cases known to be of interest for the purposes of returning to the program, the system itself might automatically insert the marker 214 to facilitate an easy return to that point. That viewing actually recommences at 12:01 p.m., and that the rightmost portion of the horizontal bar is already slightly past the marker 214, as it is assumed that the operation itself will take one or more seconds to complete.

Figure 2C:
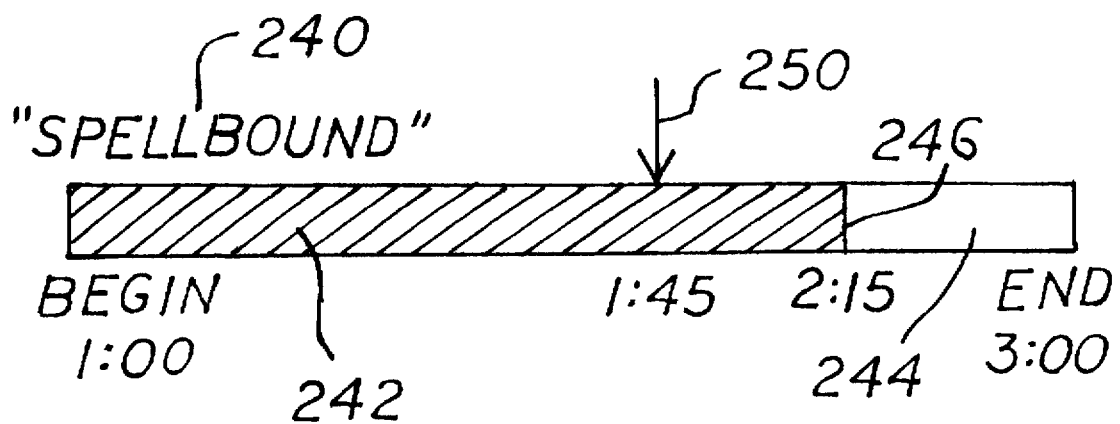
FIG. 2C is yet a further display generated by a version of the invention wherein schedule information is previously available, including the name of the program, start time and end time.

FIG. 2C illustrates one possible graphical display associated with the recording of a program for which information about the program is known in advance, including start time, ending time and, perhaps the title. Such future program schedule information may be provided either through a downloaded broadcast or in the form of a removable read-only memory, as described, for example, in U.S. Pat. No. 4,908,713. Thus, in FIG. 2C, the system "knows" that the program currently being recorded began at, say, 1 p.m. and will end at 3:00 p.m. In this case, the width of the horizontal bar may remain fixed and indicative of a program length, but divided into a left-hand already recorded portion 242 and a right-hand yet-to-be-recorded portion 244, separated by a delineation 246 indicative of current time. Thus, as the program is received and recorded, this boundary 246 will slowly move from left to right in this particular embodiment, to convey to a viewer that a larger and larger percentage of the incoming program is being stored. Conveniently, the left portion 242 and right portion 244 may be of different textures or colors, such as green and red, respectively.

Continuing the reference to FIG. 2C, a cursor or arrow 250, similar to that described with reference to FIG. 2A and 2B, may be moved by the operator to any point in the section 242, hence the convenient use of a green color for this area. By activating a REVIEW button, this arrow 250 will slowly move to the left in the diagram, with the previously recorded portion traversed being output in backwards fashion, much like the REWIND operation of a cassette tape during PLAY mode. Alternatively, the operator may simply drag the arrow 250 to any portion of the area 242, and, when movement of the arrow ceases, playback of the recorded material will resume from that point in time-shifted fashion, much like a very fast and direct rewind operation. Regardless of how the arrow 250 is moved within the area 242, a time may optionally be displayed in conjunction therewith, as being indicative of that time in the particular program where the arrow 250 has come to rest. Although the times shown in FIG. 2C have to do with the actual times associated with the broadcast of the program, alternatively, the user may selectively display times relative to the start of the program, even if actual schedule information has been made available, in which the leftmost value would read 0 and the rightmost value would read 2 hours, in this case indicating a two-hour program.

Having thus described my invention, I claim:

1. Video time-shifting apparatus, comprising:
   an input to receive a video program from a source of such programs;
   a video output to view the program on an associated display device;
   video record/playback means, including:
      a storage medium having a plurality of circular recording surfaces, each with a spiral recording track having start-of-track and end-of-track positions,
      a plurality of write heads to record information representative of the video program as the program is received, each write head being associated with a different recording surface and associated spiral recording track,
      means for moving the write heads in controlled fashion relative to their respective recording surfaces and tracks, with the apparatus automatically terminating recording with respect to a given write head upon reaching one of the start-of-track or end-of-track positions, while immediately initiating recording with a different write head, so as to effectively link the different spiral recording tracks into a continuous track for recording and playback purposes, and
      a read head in communication with the video output which is capable of accessing the continuous recording track asynchronously from the write heads;
   a memory for storing information relating to points in the program; and
   a user control in communication with the video record/playback means and the memory, the user control being operative to:
      cause the memory to store information relating to a particular point in the program as it is received and begin playback from that point after a delay, thereby outputting a time-shifted version of the program which simulates a PAUSE/RESUME function.

2. The video time-shifting apparatus of claim 1, the user control being further operative to:
   cause the read head to access a previously recorded point in the program and begin playback from that point, thereby outputting a time-shifted version of the program which simulates a REWIND function.

3. The video time-shifting apparatus of claim 1, the user control being further operative to:
   cause the read head to access a point in the program associated with a time-shifted version of the program and begin playback from that point, including points associated with a reduced time shift, thereby simulating a FAST FORWARD function.

4. The video time-shifting apparatus of claim 1, including a plurality of write heads associated with different recording surfaces in a disk drive.

5. The video time-shifting apparatus of claim 1, wherein the recording surfaces are associated with a magnetic disk drive.

6. The video time-shifting apparatus of claim 1, wherein the recording surfaces are associated with an optical disk drive.

7. The video time-shifting apparatus of claim 1, wherein the recording surfaces are associated with a magneto-optical disk drive.

8. The video time-shifting apparatus of claim 1, wherein the write heads are radially aligned relative to spiral tracks, and moved in unison relative to their respective recording surfaces, such that when the heads have moved radially inward or outward to their fullest extent, writing switches from one head to the other.

9. The video time-shifting apparatus of claim 8, wherein the pair of write heads are disposed on opposite side of the same disk.

10. The video time-shifting apparatus of claim 8, wherein the pair of write heads are associated with different disks.

11. The video time-shifting apparatus of claim 1, wherein the source of video programs includes a broadcast signal.

12. The video time-shifting apparatus of claim 1, wherein the video program source is a video cassette.

13. The video time-shifting apparatus of claim 1, further including a video display generator in operative communication with the video output, video record/playback means and user control, the video display generator being operative to output for viewing on the display device visual indicia relating to a point in the program.

14. The video time-shifting apparatus of claim 13, the video display generator being further operative to output for viewing on the display device visual indicia relating to a point in the time-shifted version of the program.

15. The video time-shifting apparatus of claim 1, the user control being further operative to enable a user to enter into the memory a user-defined point in the program, and cause the read head to begin playback from that point.

16. The video time-shifting apparatus of claim 1, further including a time-keeping device, and wherein the points in the program are time-related.

17. The video time-shifting apparatus of claim 1, wherein the recorded information representative of the program is substantially analog.

18. The video time-shifting apparatus of claim 1, wherein the recorded information representative of the program is substantially digital.

19. The video time-shifting apparatus of claim 1, further including means to record the information in digitally compressed form and decompress the information for output to the display device.

* * * * *